(12) United States Patent
Amaral

(10) Patent No.: US 9,231,455 B2
(45) Date of Patent: Jan. 5, 2016

(54) ELECTRICAL MACHINE HAVING A CONTACT ELEMENT FOR ELECTRICALLY CONNECTING ELECTRICAL COMPONENTS

(75) Inventor: Daniel Amaral, Cambui Campinas (BR)

(73) Assignee: ROBERT BOSCH GMBH, Stuttgart (DE)

( * ) Notice: Subject to any disclaimer, the term of this patent is extended or adjusted under 35 U.S.C. 154(b) by 670 days.

(21) Appl. No.: 13/063,910

(22) PCT Filed: Aug. 13, 2009

(86) PCT No.: PCT/EP2009/060505
§ 371 (c)(1),
(2), (4) Date: Jun. 16, 2011

(87) PCT Pub. No.: WO2010/037592
PCT Pub. Date: Apr. 8, 2010

(65) Prior Publication Data
US 2011/0241497 A1    Oct. 6, 2011

(30) Foreign Application Priority Data
Sep. 30, 2008  (DE) .......................... 10 2008 042 504

(51) Int. Cl.
H02K 9/06    (2006.01)
H02K 11/00   (2006.01)
H02K 11/04   (2006.01)

(52) U.S. Cl.
CPC ................................... *H02K 11/046* (2013.01)

(58) Field of Classification Search
CPC ................................................... H02K 11/046
USPC ........................................ 310/68 D, 60 R, 71
See application file for complete search history.

(56) References Cited

U.S. PATENT DOCUMENTS

| | | | | |
|---|---|---|---|---|
| 3,641,374 A | * | 2/1972 | Sato | 310/68 D |
| 4,103,193 A | | 7/1978 | Ito | |
| 4,540,907 A | * | 9/1985 | Hagenlocher et al. | 310/68 D |
| 4,606,000 A | * | 8/1986 | Steele et al. | 363/145 |
| 4,751,448 A | | 6/1988 | Auinger | |
| 4,952,829 A | | 8/1990 | Armbruster et al. | |
| 6,285,100 B1 | | 9/2001 | Pflueger | |
| 6,359,352 B2 | * | 3/2002 | Asao | 310/68 D |
| 7,268,456 B2 | * | 9/2007 | Harada et al. | 310/201 |
| 7,505,273 B2 | * | 3/2009 | Braun et al. | 361/709 |

(Continued)

FOREIGN PATENT DOCUMENTS

| | | |
|---|---|---|
| DE | 2649429 | 6/1977 |
| DE | 3345272 | 7/1985 |

(Continued)

OTHER PUBLICATIONS

International Search Report, PCT International Patent Application No. PCT/EP2009/060505, dated Dec. 10, 2009.

*Primary Examiner* — Alex W Mok
(74) *Attorney, Agent, or Firm* — Kenyon & Kenyon LLP

(57) ABSTRACT

An electrical machine, in particular a generator, preferably a claw pole generator, having a contact element for electrically connecting electrical components, which is made up of a generally arc-shaped, electrically non-conductive substrate having arc end areas, including electrical conductors for connecting the components. At least one of the electrical conductors is designed as an external connection conductor, which runs outside the substrate from one arc end area to the other arc end area.

19 Claims, 7 Drawing Sheets

(56) References Cited

U.S. PATENT DOCUMENTS

| | | |
|---|---|---|
| 8,269,387 B2 * | 9/2012 | Endo et al. .................. 310/71 |
| 2006/0131969 A1 * | 6/2006 | DePetris et al. ............ 310/68 D |
| 2007/0046114 A1 * | 3/2007 | Kondo et al. ............... 310/68 D |
| 2007/0063598 A1 * | 3/2007 | Engesser et al. ............. 310/71 |
| 2007/0103012 A1 * | 5/2007 | An et al. .................... 310/68 D |
| 2007/0296289 A1 * | 12/2007 | Wolf et al. ................. 310/68 D |
| 2008/0042501 A1 * | 2/2008 | Malanga et al. ............ 310/68 D |
| 2008/0211331 A1 * | 9/2008 | Dubuc et al. ................. 310/71 |
| 2008/0218035 A1 * | 9/2008 | Naghshineh ............... 310/68 D |

FOREIGN PATENT DOCUMENTS

| | | |
|---|---|---|
| DE | 03 23 482 | 12/2004 |
| DE | 103 61 862 | 7/2005 |
| DE | 10 2004 040 595 | 2/2006 |
| DE | 10 2005 023 363 | 11/2006 |
| EP | 0960464 | 12/1999 |
| GB | 2466090 A * | 6/2010 |
| WO | WO 8902161 | 3/1989 |
| WO | WO 2009051161 A1 * | 4/2009 |

* cited by examiner

ELECTRICAL MACHINE HAVING A CONTACT ELEMENT FOR ELECTRICALLY CONNECTING ELECTRICAL COMPONENTS

FIELD OF THE INVENTION

The present invention relates to an electrical machine, in particular a generator, preferably a claw pole generator, having a contact element for electrically connecting electrical components, which is made up of a generally arc-shaped, electrically non-conductive substrate having arc end areas, including electrical conductors for connecting the components.

BACKGROUND INFORMATION

Conventionally, contact elements are employed in electrical machines for electrically connecting electrical components.

European Patent No. EP 0 960 464 describes an electrical machine having a contact element which is of a generally arc-shaped design and has arc end areas. The contact element has a plurality of conductors that run within a substrate of the contact element. A conductor is provided in the contact element which extends from one arc end area to the other arc end area. The conductor extends through the substrate with an angular path. The angular path is needed so that the conductor does not come into electrical contact with other conductors present in the substrate and thus produce a short circuit. This results in a very complex wiring geometry, which is complicated and expensive to produce and requires great accuracy during installation in the substrate. Furthermore, the angular path within the substrate due to the arc-shaped path of the contact element results in great wiring length, which leads to line losses. A contact element is needed which may be manufactured in a simple and reliable way and reduces conventional line losses.

SUMMARY

In accordance with the present invention, at least one of the electrical conductors is designed as an external connection conductor, which runs outside the substrate from one arc end area to the other arc end area. The result is thus a generally straight run of the external connection conductor from one of the arc end areas to the other arc end area. This produces a shortening of the wiring, which results in minor line losses. Furthermore, the manufacturing of the contact element is made simpler and more economical, since the substrate does not have to enclose the conductor and hence only a small amount of substrate is needed. At the same time, the geometry of the external connecting conductor may be greatly simplified compared to a conductor situated in the substrate, resulting in additional simplification of the manufacturing process. In addition, the risk of a short circuit between the external connecting conductor and other conductors situated in the substrate is minimized or completely eliminated. In order to prevent an electrical connection of the external conductor to other components in the electrical machine, it is preferably provided that the external connecting conductor is furnished with an insulating material so that the external connecting conductor is insulated toward the outside in the area between the arc end areas and is electrically contacted and/or contactable within the arc end areas.

A refinement of the present invention provides that the path of the external connecting conductor running between the arc end areas is arc-chord-shaped, arc-shaped and/or angular. The design of the path of the external connecting conductor between the arc end areas enables it to be adapted to the geometry of the electrical machine in the area in which the contact element is employed. The arc-chord-shaped path results in the external connecting conductor with the shortest wiring length, since the arc end areas are connected to one another in a direct route. The arc-shaped and angular paths, on the other hand, offer the option of adapting the external connecting conductor to the electrical machine. The path of the external connecting conductor in this case should be as short as possible and assume the simplest path possible, in order to be able to simplify a manufacturing process in this way.

A refinement of the present invention provides that when the external connecting conductor is arc-shaped, its arc runs opposite to the arc-shaped path of the contact element. This results in the contact element with its substrate and the external connecting conductor enclosing a particularly large opening, which is able to accommodate components of the electrical machine. Thus, a closed, ring-like structure is formed overall, which allows optimal placement of the contact element within the electrical machine.

A refinement of the present invention provides that at least one conductor, preferably the external connecting conductor, is a solid conductor. The design of the conductors as solid conductors results in the conductors being inherently stiff. In particular in the case of the external connecting conductor, this results in its maintaining the predefined path on its own, without becoming deformed due to the effect of a force. It is also possible to shape the external connecting conductor in advance and to insert it into the substrate in the course of the manufacturing process. In particular, the solid conductor may be designed as a stamped part.

According to a refinement of the present invention, an arrangement is provided which bring about a stream of cooling air in the electrical machine. This arrangement may include, for example, fan impellers. The stream of cooling air preferably cools the interior of the entire electrical machine.

A refinement of the present invention provides that the contact element is situated essentially in the stream of cooling air and that the external connecting conductor is situated outside of the stream of cooling air. This type of arrangement makes it possible for the external connecting conductor to not impair the cooling function of the stream of cooling air and enables the latter to cool the substrate optimally. It is also advantageous if the external connecting conductor is situated inside the electrical machine in such a way that the stream of cooling air is not impaired in its task of cooling the electrical machine.

According to a refinement of the present invention, a stator is provided which has at least five phase windings, the contact element forming a pentagram circuit with the phase windings.

A refinement of the present invention provides that at least two of the phase windings of the pentagram circuit are electrically connected to one another via the external conductor element. The pentagram circuit links five phase windings, which are situated on a stator, offset from one another at an angle. To this end, each phase winding but one is electrically connected to a next phase winding, viewed in the circumferential direction. The uneven number results in the phase windings being connected in series, the last phase winding being connected to the first phase winding so that an electrical circuit results. The position of the phase windings within the circuit is different from the position of the phase winding in the stator, so that the last phase winding cannot be connected to the first phase winding like the other phase windings. The first and the last phase winding in the stator may be situated at a distance from each other, so that a conductor is needed for bridging that distance. This may be done in an advantageous manner using the external connecting conductor, since the latter is able to produce a direct and particularly short connection between the two phase windings. At the same time, a resistance equilibrium is maintained in an advantageous manner within the stator, so that negative effects on noise development of the electrical machine are avoided. Furthermore, it is possible to prevent complex and expensive wiring techniques within the stator which would connect the two phase windings within the stator to one another, and to replace them with the external connecting conductor.

One refinement of the present invention provides that the contact element is a plug-in contact element. The contact element in this specific embodiment may be plugged into the electrical machine, in order to be installed at its site of operation. In particular, it is provided that a plug-in connection of the plug-in contact element is established with the components, so that the contact element is electrically connected to the components by plugging the contact element into the electrical machine. This results in simple manufacturing, as well as a possibility of servicing and replacing the contact element easily within the electrical machine.

One refinement of the present invention provides that the contact element forms an electrical rectifier with the components. At the same time it is provided in particular that the components are diodes. In this case, the individual conductors are situated within the contact element in such a way that they are able to connect multiple diodes to form a rectifier. The rectifier is preferably used to rectify an AC voltage produced by the generator into a DC voltage. For this reason the rectifier must be connected not only to the components in the form of diodes, but also to the stator. The term component is also applied to phase windings of the stator. This is particularly advantageous when two phase windings are connected with the aid of the external conductor element, since in that case there is already a connection of two windings with the contact element.

According to a refinement of the present invention, a rectifier module is provided that has the rectifier, at least one base plate and at least one heat sink. This rectifier module preferably forms a compact unit which may be pre-installed in the electrical machine. It is advantageous if the components, in particular the diodes, are at least partially situated in the rectifier module and/or in the heat sink. In this case the possibility exists that the components are able to give off heat, which they develop during use, to both the base plate and the heat sink, and at the same time that they have a fixed installation position within the rectifier module.

One refinement of the present invention provides that the contact element is situated in the rectifier module between the base plate and the heat sink. This results in a particularly rapid assembly of the rectifier module during the manufacturing process.

BRIEF DESCRIPTION OF THE DRAWINGS

A preferred specific embodiment of the present invention is explained below on basis of the figures.

DETAILED DESCRIPTION OF EXAMPLE EMBODIMENTS

Figure 1:
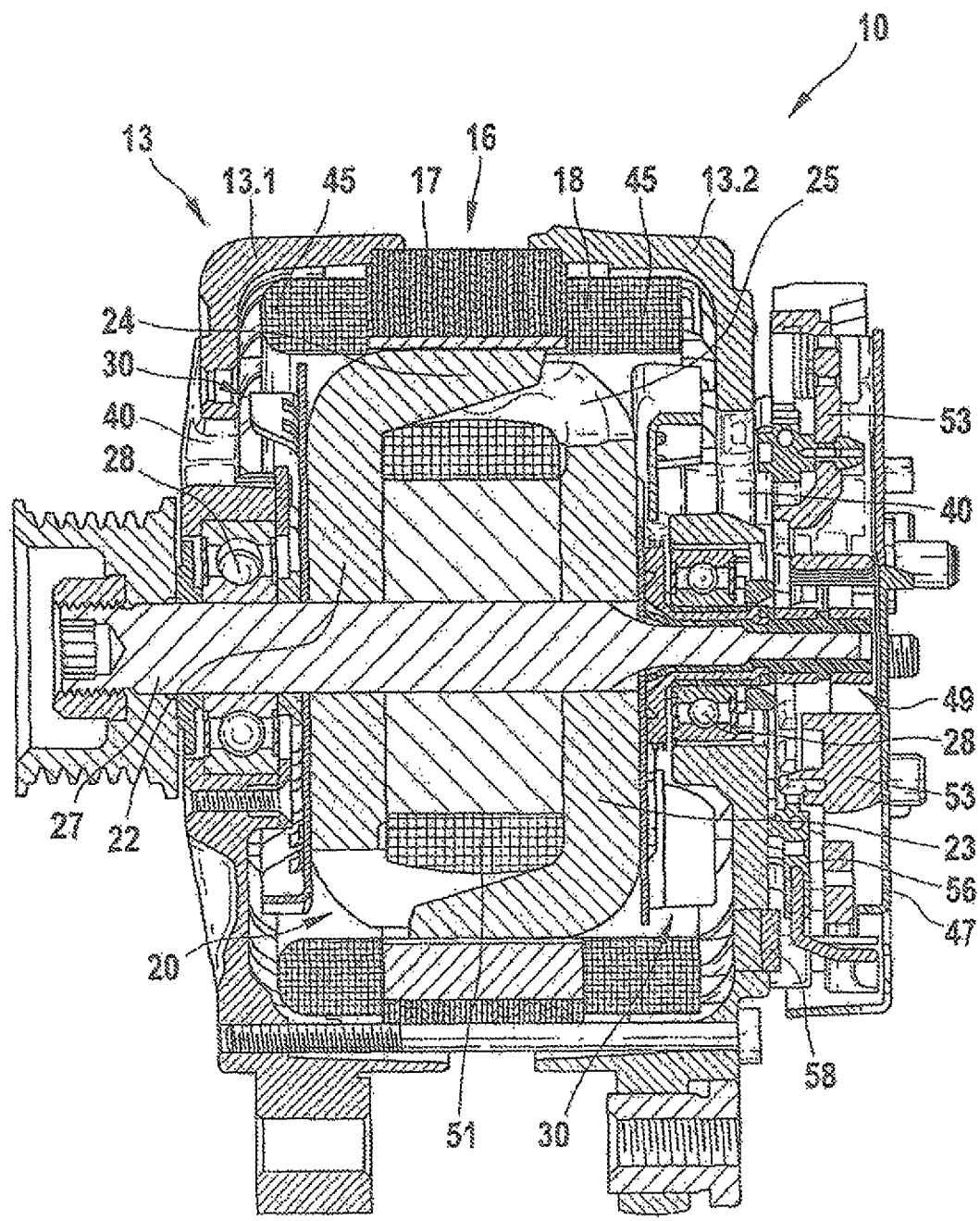
FIG. 1 shows a cross section of a conventional generator.

FIG. 1 shows a conventional electrical machine 10.

FIG. 1 shows a cross section through an electrical machine 10, implemented here as a generator or an alternator for motor vehicles. This electrical machine 10 has, among other things, a two-part housing 13, which is made up of a first end shield 13.1 and a second end shield 13.2. End shield 13.1 and end shield 13.2 accommodate a so-called stator 16, which has on the one hand a generally annular stator core 17, and into whose radially inward-facing, axially extending slots a stator winding 18 is inserted. The radially inward-facing slotted surface of this annular stator 16 surrounds a rotor 20, which is designed as a claw pole rotor. Rotor 20 is made up in part of two claw pole plates 22 and 23, at whose external circumferences claw pole fingers 24 and 25 are situated which extend in the axial direction. The two claw pole plates 22 and 23 are positioned in rotor 20 in such a way that their axially extending claw pole fingers 24 and 25 alternate on the circumference of rotor 20. This results in magnetically necessary gaps between oppositely magnetized claw pole fingers 24 and 25, which are known as claw pole air gaps. Rotor 20 is rotatably mounted with the aid of a shaft 27 and bearings 28 located on each side of the rotor in the respective end shields 13.1 and 13.2.

Rotor 20 has a total of two axial end faces, to each of which a fan 30 is attached. This fan 30 is made up generally of a plate-like or disk-like section, from which fan blades extend in a known manner. These fans 30 serve to enable an exchange of air between the exterior of electrical machine 10 and the interior of electrical machine 10, through openings 40 in end shields 13.1 and 13.2. To that end, openings 40 are provided generally at the axial ends of end shields 13.2 and 13.2, via which cooling air is drawn into the interior of electrical machine 10 with the aid of fans 30. This cooling air is accelerated radially toward the outside by the rotation of fans 30, so that it is able to pass through the cooling-air-permeable winding overhang 45. Winding overhang 45 is cooled by this effect. After passing through winding overhang 45 or after flowing around winding overhang 45, the cooling air follows a path radially toward the outside, through openings that are not shown here in this FIG. 1.

On the right side of FIG. 1 is a protective cap 47, which protects various components from environmental influences. For example, this protective cap 47 cuts off a so-called slip-ring component 49, which is used for supplying an excitation winding 51 with excitation current. Situated around this slip-ring component 49 is a heat sink 53, which acts here as a positive heat sink. End shield 13.2 acts as a so-called negative heat sink. Situated between end shield 13.2 and heat sink 53 is a connecting plate 56, which is used for connecting together negative diodes 58 situated in end shield 13.2 and positive diodes in heat sink 53 which are not shown in this representation, and thus to represent a conventional bridge circuit.

Figure 2:
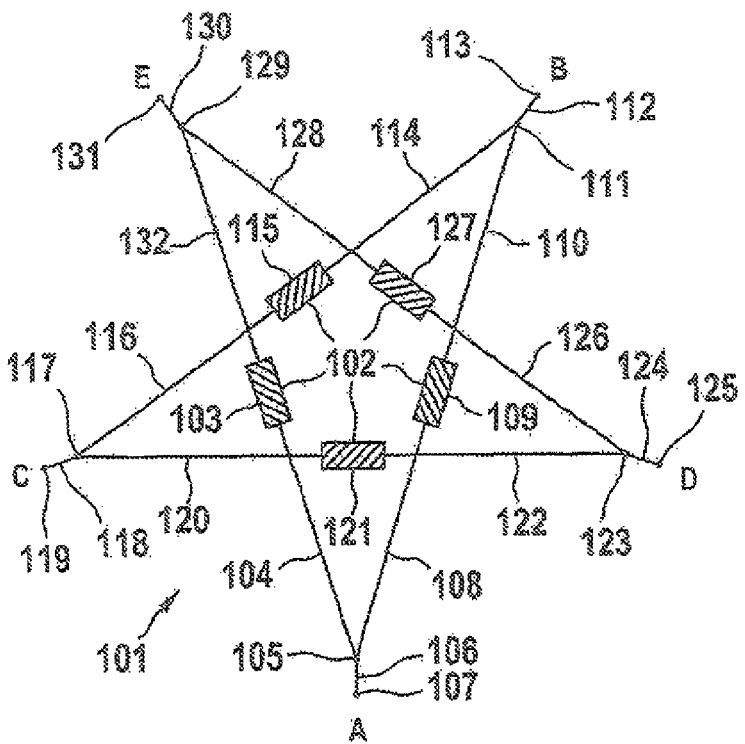
FIG. 2 shows schematically shows a pentagram circuit.

FIG. 2 schematically shows a pentagram circuit 101 which has five phase windings 102. A first phase winding 103 is connected to a junction 105 via a conductor 104. Starting from junction 105, a conductor 106 runs to a connecting point 107. Connecting point 107 is identified as A. Starting from junction 105, another conductor 108 runs to a second phase winding 109. From second phase winding 109 a conductor 110 runs to a junction 111, which is connected via a conductor 112 to a connecting point 113, which is identified as B. Starting from junction 111, a conductor 114 runs to a third phase winding 115. Third phase winding 115 is connected to a junction 117 via a conductor 116. From junction 117 a conductor 118 runs to a connecting point 119, which is identified as C. Starting from junction 117, a conductor 120 extends to a fourth phase winding 121, which in turn is connected to a junction 123 via another conductor 122. Starting from junction 123 a conductor 124 runs to a connecting point 125, which is identified as D. Junction 123 is additionally connected via a conductor 126 to a fifth phase winding 127, which is additionally in contact with a junction 129 via a conductor 128. Junction 129 is connected to a connecting point 131 via a conductor 130 and to first phase winding 3 via a conductor 132, which closes an electrical circuit within which phase windings 102 are connected in series. Connecting points 107, 125, 112, 131 and 119 are used for drawing current.

Figure 3:
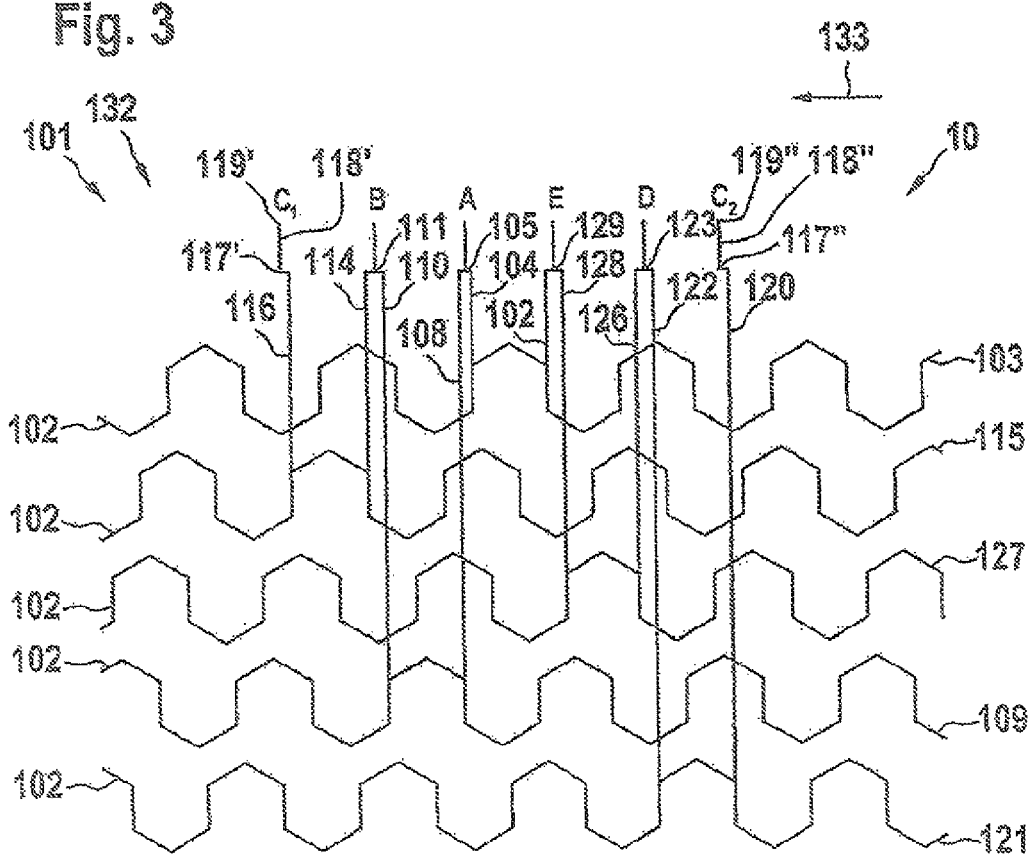
FIG. 3 shows schematically shows a winding arrangement of a stator having five phase windings.

FIG. 3 schematically shows a representation of phase windings 102 situated one below the other. The figure shows a schematic implementation 132 of pentagram circuit 101 from FIG. 2. In contrast to FIG. 2, connecting point 119 is replaced by two associated connecting points 119' and 119" which are not connected to one another here, resulting in two junctions 117' and 117". Connecting points 119' and 119" are identified as C1 and C2. In the same manner, two conductors 118' and 118" result accordingly. An arrow 133 indicates a winding direction of phase windings 102. The representation clarifies an offset position of phase windings 102, whereby a separate measure is required to produce junction 117, which is assigned to connecting point 119. The other junctions 111, 105, 129 and 123, on the other hand, may be manufactured in a simple manner.

The offsetting of phase windings 102 relative to one another results in the already mentioned need to establish a connection between connecting points 119' and 119". At the same time, a resistance equilibrium of phase windings 102 must be maintained as largely as possible when joining connecting points 119' and 119".

Figure 4:
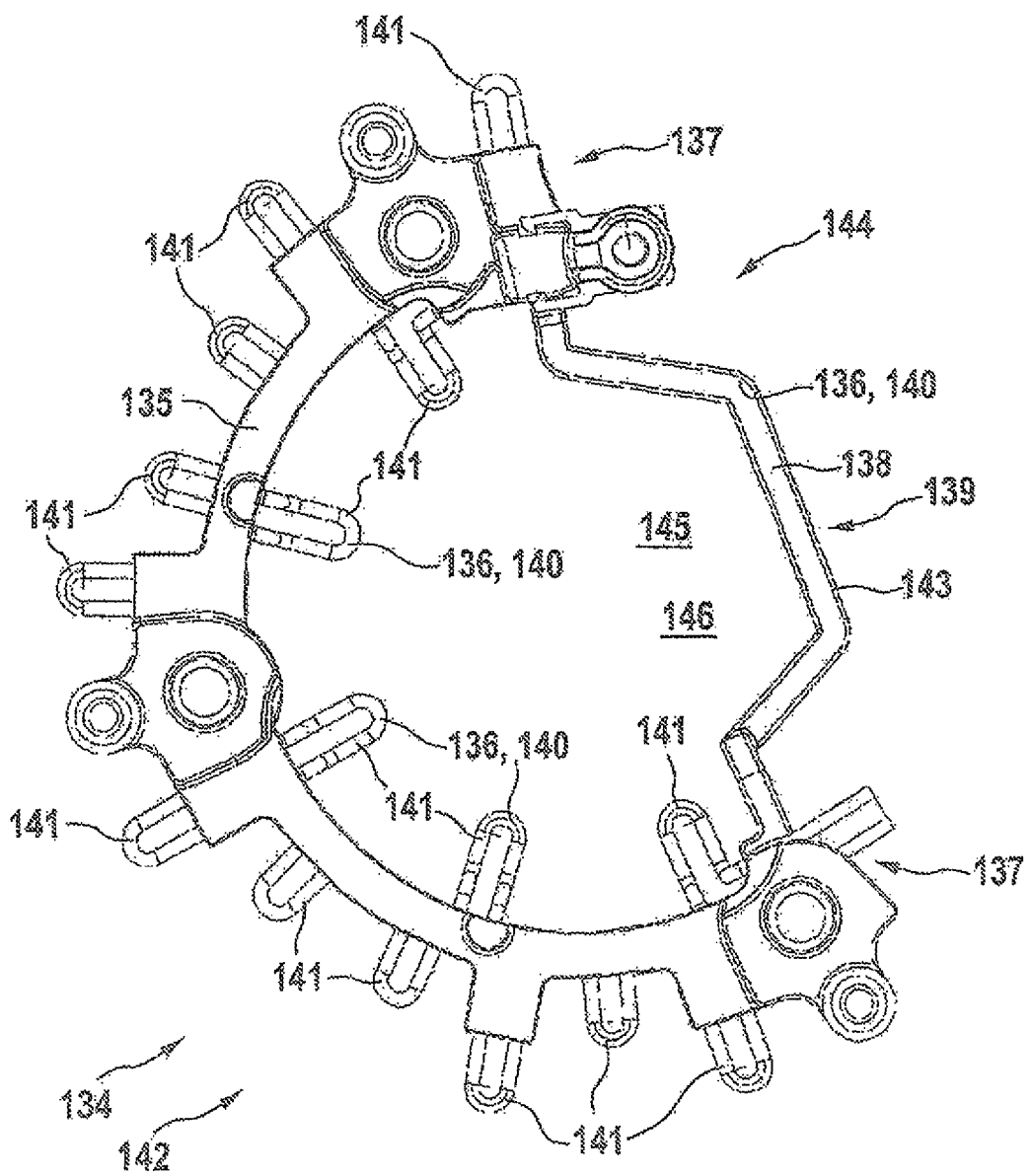
FIG. 4 shows a contact element in a top view.

FIG. 4 shows a contact element 134 in a top view. Contact element 134 is made up of a substrate 135 of arc-shaped design. Conductors 136 run within substrate 135. Conductors 136 are situated at a distance from one another and are not electrically connected to one another. Contact element 134 has arc end areas 137. One of the conductors 136, which is designed as an external connecting conductor 138, extends between arc end areas 137. The path of external connecting conductor 138 is of angular design, in such a way that an arc 139 is formed whose path is contrary to the arc-shaped path of substrate 135. Furthermore, conductors 136 are all designed as solid conductors 140, which means that they are not cables having multiple wires, but solid, electrically conductive material. Each conductor 136 has multiple contact loops 141, which are formed by conductors 136 and lie outside of substrate 135. Contact loops 141 are used for making contact with components which are preferably inserted into contact loops 141. Hence contact element 134 is designed as a plug-in contact element 142. External connecting conductor 138 has an insulation 143 which is present only between arc end areas 137 in the external area of external connecting conductor 138. Furthermore, external connecting conductor 138 and substrate 135 form an annular structure 144 due to the opposing orientation of the arc-shaped paths. Annular structure 144 encloses an opening 145, which is designed as a ring opening 146.

The path of external connecting conductor 138 outside of substrate 135 results in a very thin arrangement of substrate 135 around conductor 136. No substrate 135 is needed to enclose external conductor 138. Furthermore, external connecting conductor 138 follows the shortest possible path from one end arc area 137 to the other end arc area 137. The angular path is employed because external connecting conductor 138 is supposed to pass around an obstruction at its place of installation. Insulation 143 may be designed as a thin layer of plastic 147 or as a coat of lacquer 148.

Figure 5:
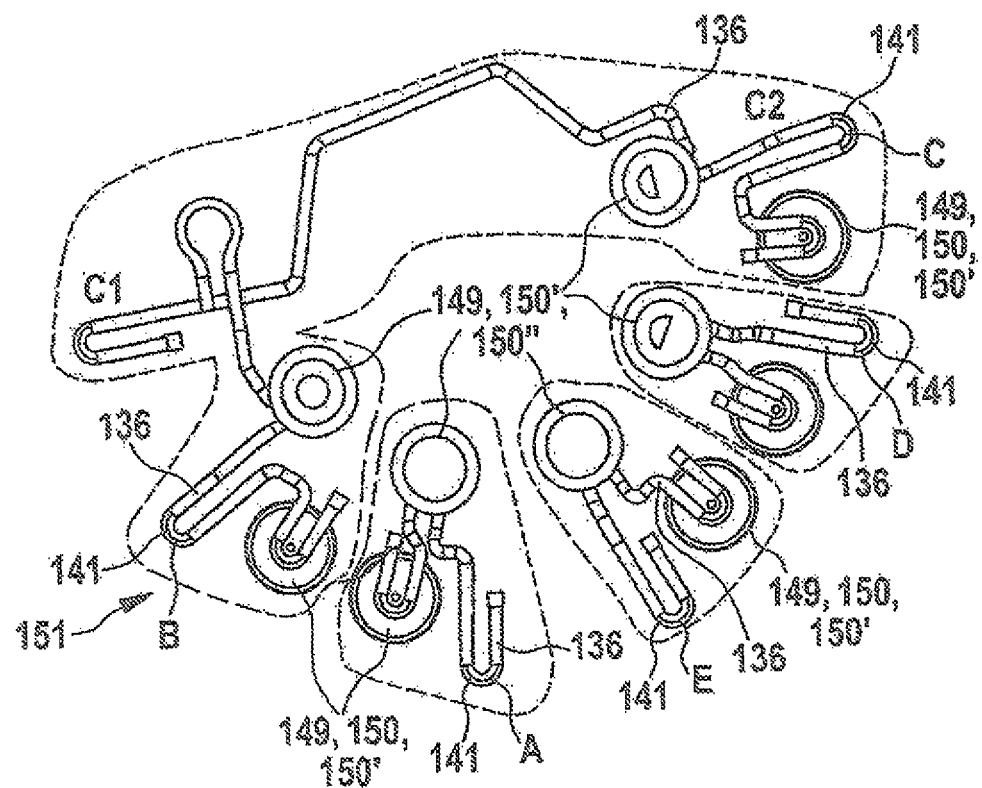
FIG. 5 shows a conductor arrangement of the contact element from FIG. 4.

FIG. 5 shows conductors 136, which are electrically connected to components 149. Components 149 are diodes 150. Components 149 together with diodes 150 form a rectifier circuit 151. For this purpose, two diodes 150 are connected to each conductor 136, one of the connected diodes 150 in each case being a positive diode 150' situated on one side of conductor 136 and the other of the diodes 150 being a negative diode 150" situated on the other side of electrical conductor 136. In addition, each conductor 136 has a contact loop 141 which is assigned to one of connecting points 107, 125, 113, 131 and 119. To make them more readily distinguishable, the corresponding contact loops 141 are assigned the letter designations A, B, C, D and E from pentagon circuit 101 of FIGS. 2 and 3. Furthermore, to make them understandable the individual conductors 136 together with the components 149 assigned to them are surrounded by dashed lines. Only conductors 136 and components 149 within an area enclosed by one of the lines are electrically connected to one another. There are no electrical connections between the two conductors 136.

Figure 6:
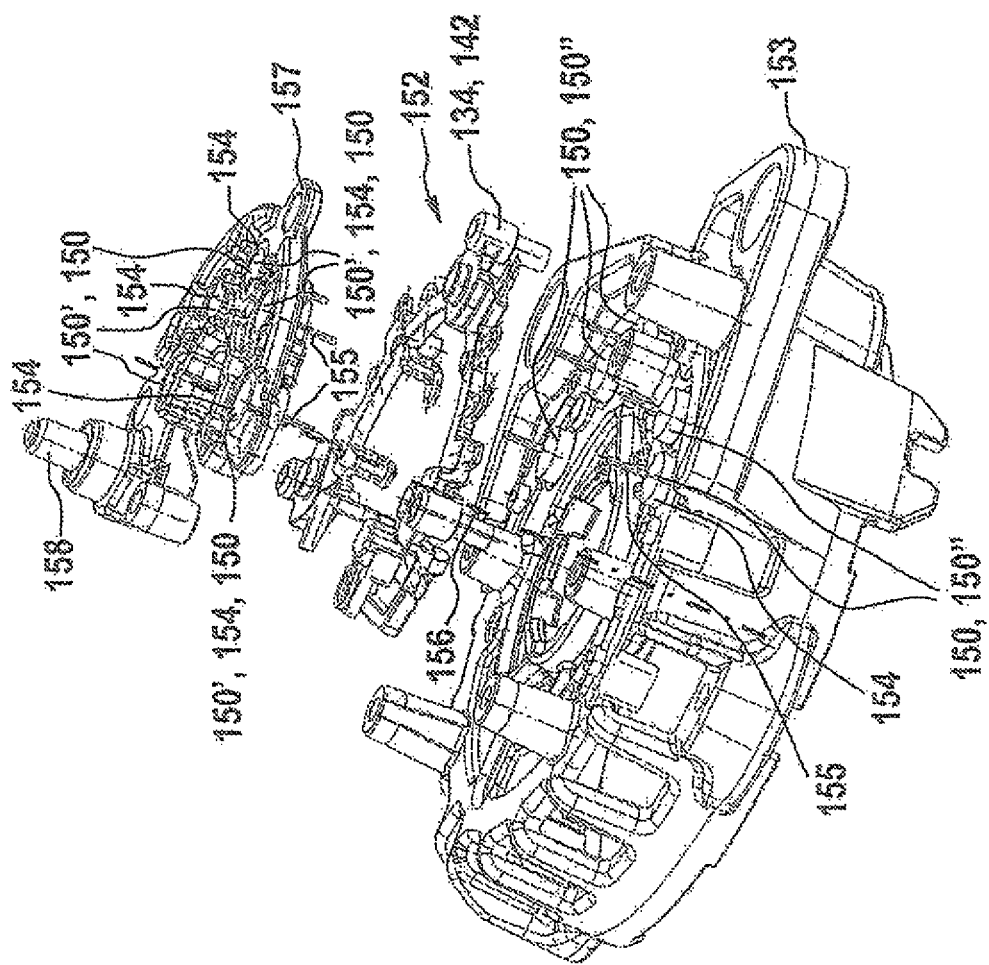
FIG. 6 shows an exploded view of a rectifier module.

FIG. 6 shows a rectifier module 152 in an exploded view. Rectifier module 152 has a base plate 153, which has multiple negative diodes 150". Each negative diode 150" is made up of a diode body 154 and a plug-in pin 155. Rectifier module 152 also has contact element 134, which is designed as a plug-in element 142 and is insertable into base plate 153 along an axis 156. In addition, rectifier module 152 has a heat sink 157, which has positive diodes 150'. Positive diodes 150' of heat sink 157 likewise each have diode body 154 and plug-in pin 155. All plug-in pins 155 run in a direction parallel to axis 156. Plug-in pins 155 of negative diodes 150" of base plate 153 have an orientation opposite to the orientation of plug-in pins 155 of positive diodes 150' of heat sink 157. Heat sink 157 may be snapped onto base plate 153, whereby contact element 134 is positioned between base plate 153 and heat sink 157. Heat sink 157 also has a battery connection 158. Negative diodes 150" of base plate 153 are electrically connected to one another via base plate 153. Positive diodes 150' of heat sink 157 are electrically connected to one another via heat sink 157.

Figure 7:
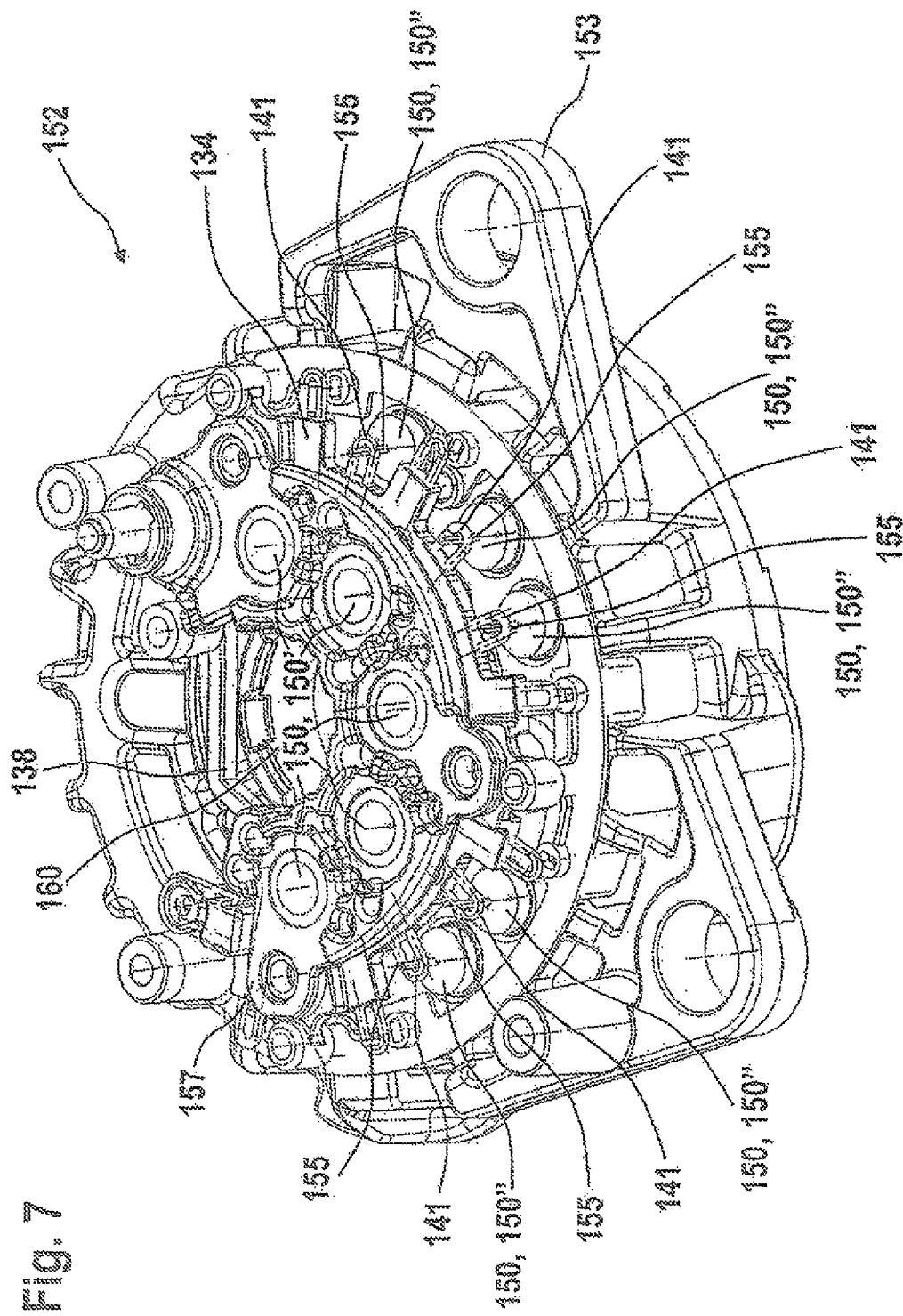
FIG. 7 shows a perspective view of the rectifier module.

FIG. 7 shows rectifier module 152 with base plate 153, contact element 134 and heat sink 157, plugged together. To each diode 150 a contact loop 141 is assigned, which is electrically connected to plug-in pins 155 of diodes 150. The connection of diodes 150 of heat sink 157 to contact element 134 is not shown, since it is hidden by heat sink 157. Hence contact element 134 together with diodes 150 forms a rectifier 159, which is integrated into rectifier module 152. External connecting conductor 138 avoids covering an opening 160 in base plate 153 because of its angular path. Opening 160 is used for receiving machine parts at the place of installation. The angular path of external connecting conductor 138 thereby prevents contact with the parts accommodated in opening 160, and therefore ensures simple and problem-free installation during the manufacture of rectifier module 152.

Figure 8:
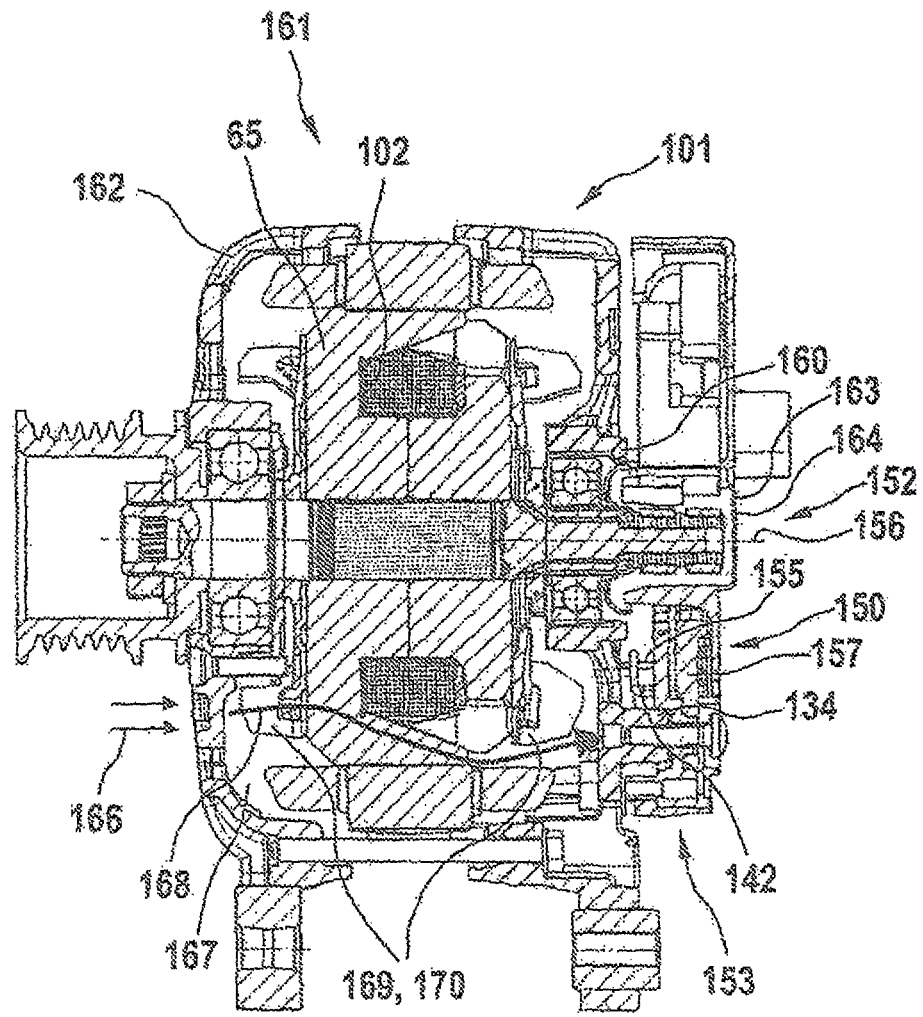
FIG. 8 shows a cross section of an electrical machine.

FIG. 8 shows an electrical machine 161. This is a generator 162 in the form of a claw pole generator 162', which has five phase windings 102 in pentagram circuit 101 of FIGS. 1 and 2. Rectifier module 152 is situated axially on electrical machine 161 along axis 156. Axis 156 runs axially through a rotational axis of a rotor 165 of electrical machine 161.

Within rectifier module 152, heat sink 157 and contact element 134 are apparent in cross section. Also shown is a contact loop 142, which is connected to a plug-in pin 155 of one of diodes 150. An axle bearing 163 which has a generally cylindrical external surface 164 is inserted into opening 160 of base plate 153 for the purpose of installing rectifier module 152. Axle bearing 163 inserted into opening 160 clearly shows the advantage of the arc-shaped path of external connecting conductor 138. Also shown is an installation position of rectifier module 152. Cooling air 166 drawn into interior 167 of electrical machine 161 forms a stream of cooling air 168 for cooling electrical machine 161. Cooling air stream 168 is brought about by means 169 in the form of fans 170. External conductor 138, not shown in FIG. 8, lies outside of cooling air stream 168, so that substrate 135 and diodes 150 are cooled without interference.

What is claimed is:

1. An electrical machine, comprising:
    a contact element for electrically connecting electrical components, the contact element including an arc-shaped, electrically non-conductive substrate having arc end areas, the arc end areas including electrical conductors for connecting components, wherein at least one of the electrical conductors is an external connecting conductor from one of the arc end areas to the other of the arc end areas.

2. The electrical machine as recited in claim 1, wherein the electrical machine is a claw-pole generator.

3. The electrical machine as recited in claim 1, wherein a path of the external connecting conductor lying between the arc end areas is at least one of arc-chord-shaped, arc-shaped, and angular.

4. The electrical machine as recited in claim 1, wherein a path of the external connecting conductor is arc-shaped, a shape of the arc being opposite to an arc-shaped path of the contact element.

5. The electrical machine as recited in claim 1, wherein the external connecting conductor is a solid conductor.

6. The electrical machine as recited in claim 1, further comprising:
    an arrangement to bring about a cooling air stream in the electrical machine.

7. The electrical machine as recited in claim 6, wherein the contact element is situated in the cooling air stream and the external connecting conductor is situated outside of the cooling air stream.

8. The electrical machine as recited in claim 1, further comprising:
    a stator which has at least five phase windings, the contact element forming a pentagram circuit with the phase windings.

9. The electrical machine as recited in claim 8, wherein at least two of the phase windings of the pentagram circuit are electrically connected to one another via the external connecting conductor.

10. The electrical machine as recited in claim 1, wherein the contact element is a plug-in contact element.

11. The electrical machine as recited in claim 1, wherein the contact element together with the components forms an electrical rectifier.

12. The electrical machine as recited in claim 11, further comprising:
    a rectifier module which has the rectifier, at least one base plate and at least one heat sink.

13. The electrical machine as recited in claim 12, wherein the contact element is situated in the rectifier module between the base plate and the heat sink.

14. The electrical machine as recited in claim 1, wherein the electrical machine is a claw-pole generator, wherein a path of the external connecting conductor lying between the arc end areas is at least one of arc-chord-shaped, arc-shaped, and angular, and wherein the external connecting conductor is a solid conductor.

15. The electrical machine as recited in claim 14, further comprising:
    an arrangement to bring about a cooling air stream in the electrical machine, wherein the contact element is situated in the cooling air stream and the external connecting conductor is situated outside of the cooling air stream; and
    a stator which has at least five phase windings, the contact element forming a pentagram circuit with the phase windings, wherein at least two of the phase windings of the pentagram circuit are electrically connected to one another via the external connecting conductor.

16. The electrical machine as recited in claim 14, further comprising:
    a rectifier module which has an electrical rectifier, at least one base plate and at least one heat sink, wherein the contact element is situated in the rectifier module between the base plate and the heat sink, wherein the contact element together with the components forms the electrical rectifier.

17. The electrical machine as recited in claim 1, wherein the electrical machine is a claw-pole generator, wherein a path of the external connecting conductor is arc-shaped, a shape of the arc being opposite to an arc-shaped path of the contact element, and wherein the external connecting conductor is a solid conductor.

18. The electrical machine as recited in claim 17, further comprising:
    an arrangement to bring about a cooling air stream in the electrical machine, wherein the contact element is situated in the cooling air stream and the external connecting conductor is situated outside of the cooling air stream; and
    a stator which has at least five phase windings, the contact element forming a pentagram circuit with the phase windings, wherein at least two of the phase windings of the pentagram circuit are electrically connected to one another via the external connecting conductor.

19. The electrical machine as recited in claim 17, further comprising:
    a rectifier module which has an electrical rectifier, at least one base plate and at least one heat sink, wherein the contact element is situated in the rectifier module between the base plate and the heat sink, wherein the contact element together with the components forms the electrical rectifier.

* * * * *